United States Patent
Montague

(10) Patent No.: US 9,834,275 B2
(45) Date of Patent: Dec. 5, 2017

(54) NON-OVERLAPPING FRAME FOLDING BIKE

(71) Applicant: Montague Corporation, Cambridge, MA (US)

(72) Inventor: David Montague, Newton, MA (US)

(73) Assignee: Montague Corporation, Cambridge, MA (US)

( * ) Notice: Subject to any disclaimer, the term of this patent is extended or adjusted under 35 U.S.C. 154(b) by 0 days.

(21) Appl. No.: 14/805,563

(22) Filed: Jul. 22, 2015

(65) Prior Publication Data

US 2017/0021892 A1 Jan. 26, 2017

(51) Int. Cl.
*B62K 15/00* (2006.01)
*B62K 3/02* (2006.01)

(52) U.S. Cl.
CPC .............. *B62K 15/006* (2013.01); *B62K 3/02* (2013.01); *B62K 2015/001* (2013.01)

(58) Field of Classification Search
CPC ............................ B62K 125/006; B62K 3/02
USPC ........................................................ 280/283
See application file for complete search history.

(56) References Cited

U.S. PATENT DOCUMENTS

| | | | |
|---|---|---|---|
| 518,330 A | 4/1894 | Ryan | |
| 569,354 A | 10/1896 | Ryan | |
| 613,244 A | 11/1898 | Chrisman | |
| 4,067,589 A | 1/1978 | Hon | |
| 4,182,522 A | 1/1980 | Ritchie | |
| 4,417,745 A * | 11/1983 | Shomo | B62K 15/006 280/287 |
| 4,448,437 A | 5/1984 | Montague | |
| 4,579,360 A | 4/1986 | Nishimura et al. | |
| 4,598,923 A | 7/1986 | Csizmadia | |
| 4,824,130 A | 4/1989 | Chiu | |
| 4,900,047 A | 2/1990 | Montague et al. | |
| 5,222,751 A | 6/1993 | Chen | |
| 5,398,955 A | 3/1995 | Yeh | |
| 5,975,551 A | 11/1999 | Montague et al. | |
| 6,270,103 B1 * | 8/2001 | Grimm | B62K 25/005 280/270 |
| 6,523,223 B2 | 2/2003 | Wang | |
| 6,595,536 B1 | 7/2003 | Tucker | |
| 6,695,334 B2 | 2/2004 | Irlbacher | |
| 6,886,844 B2 | 5/2005 | Ritchey | |

(Continued)

FOREIGN PATENT DOCUMENTS

| | | |
|---|---|---|
| CN | 1315686 A | 5/2007 |
| DE | 2038816 A1 | 3/1971 |

(Continued)

*Primary Examiner* — Tony H. Winner
*Assistant Examiner* — Felicia L. Brittman
(74) *Attorney, Agent, or Firm* — Sughrue Mion, PLLC

(57) ABSTRACT

A folding bike designed such that when the bicycle is folded, the front and rear frame structural members bypass each other in a non-overlapping manner except at folding and fastening positions using an axis of rotation at or near the seat tube, wherein the folding bicycle maintains a rigid riding position using an innovative fastening mechanism positioned to fasten by actuation of a member located not above the uppermost surface of the front frame, and which may be equipped with primary and secondary retention wherein the secondary retention may automatically engage when the bike is unfolded to the operative riding position.

18 Claims, 9 Drawing Sheets

(56) References Cited

U.S. PATENT DOCUMENTS

| | | |
|---|---|---|
| 6,886,845 B2 | 5/2005 | Chao |
| 6,929,277 B2 | 8/2005 | Chao |
| 7,121,567 B1 | 10/2006 | Gaea |
| 7,722,070 B2 | 5/2010 | Ritchey |
| 8,123,243 B2 | 2/2012 | Ho |
| 8,141,893 B2 | 3/2012 | Lin |
| 2011/0169246 A1 | 7/2011 | Lin |
| 2012/0169029 A1 | 7/2012 | Marais et al. |
| 2014/0239611 A1 | 8/2014 | Hon et al. |

FOREIGN PATENT DOCUMENTS

| | | | |
|---|---|---|---|
| DE | 4207771 A1 | 9/1993 | |
| EP | 1184274 A2 | 3/2002 | |
| WO | WO 9903723 A1 * | 1/1999 | ............... B62K 3/12 |
| WO | 02/42148 A1 | 5/2002 | |

* cited by examiner

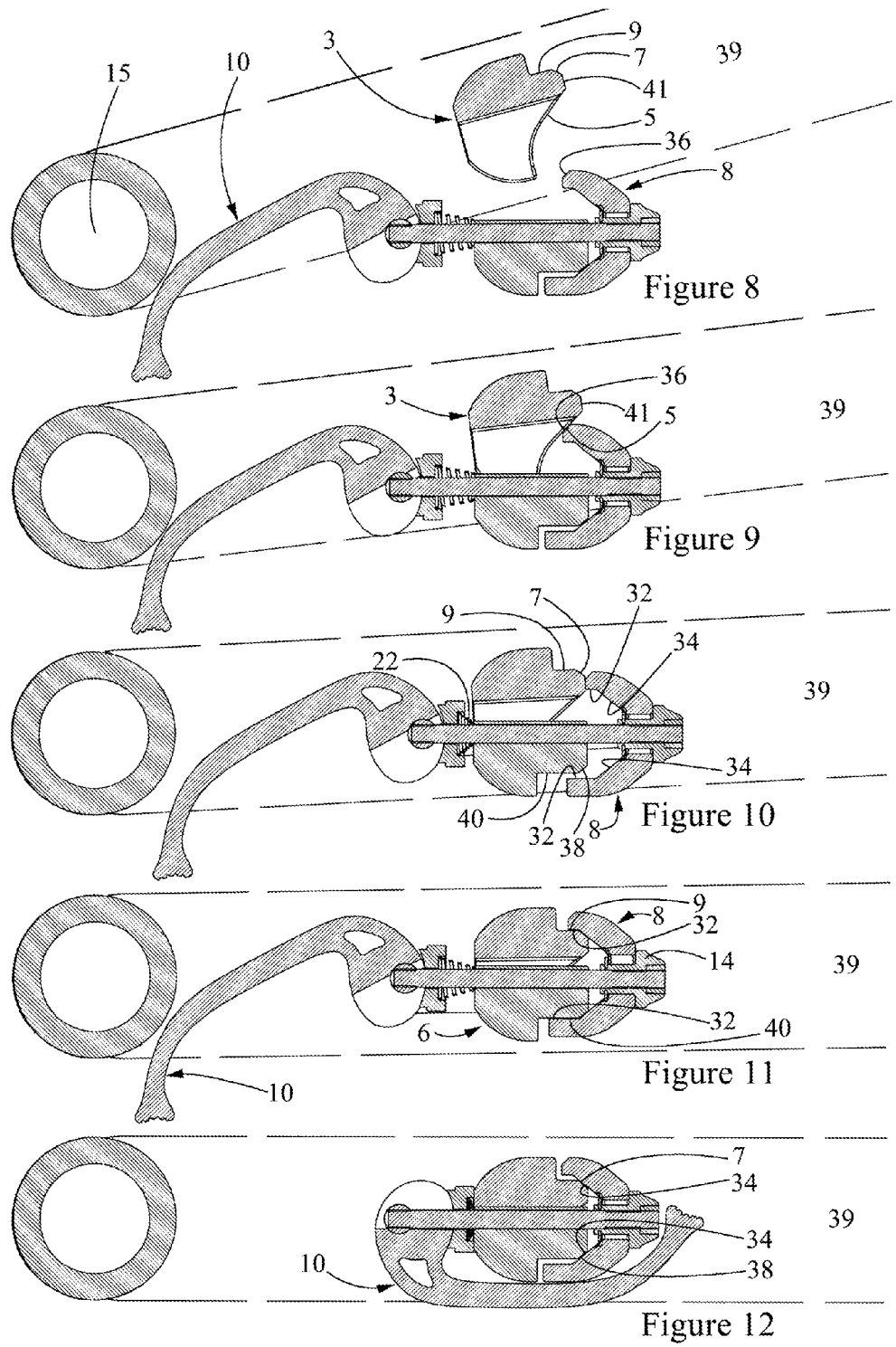

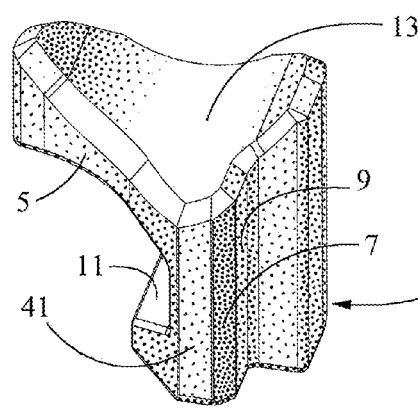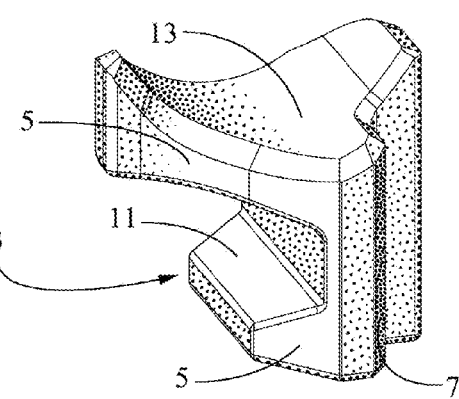
Figure 13    Figure 14
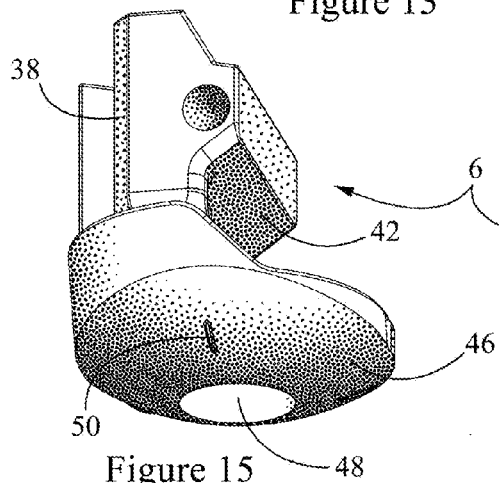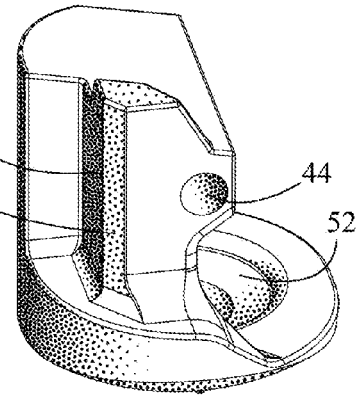
Figure 15    Figure 16
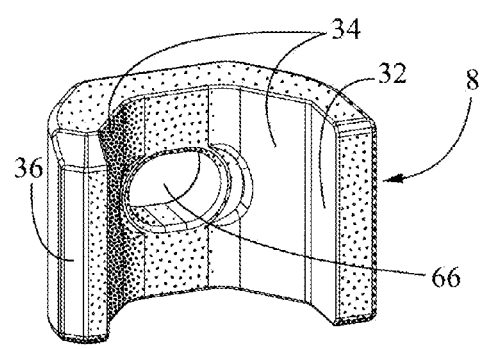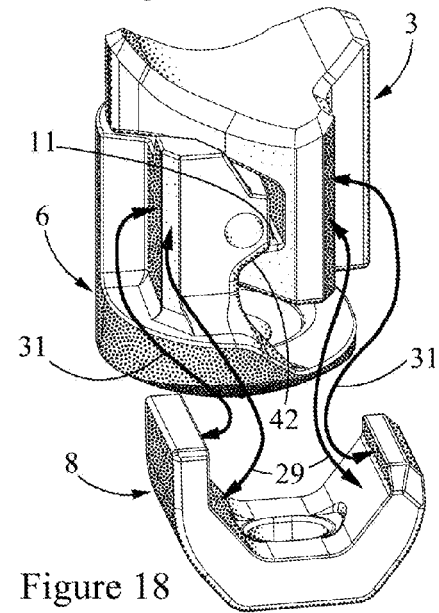
Figure 17    Figure 18

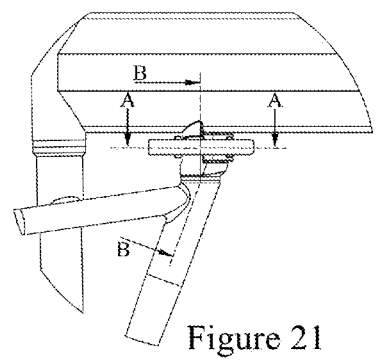
Figure 21
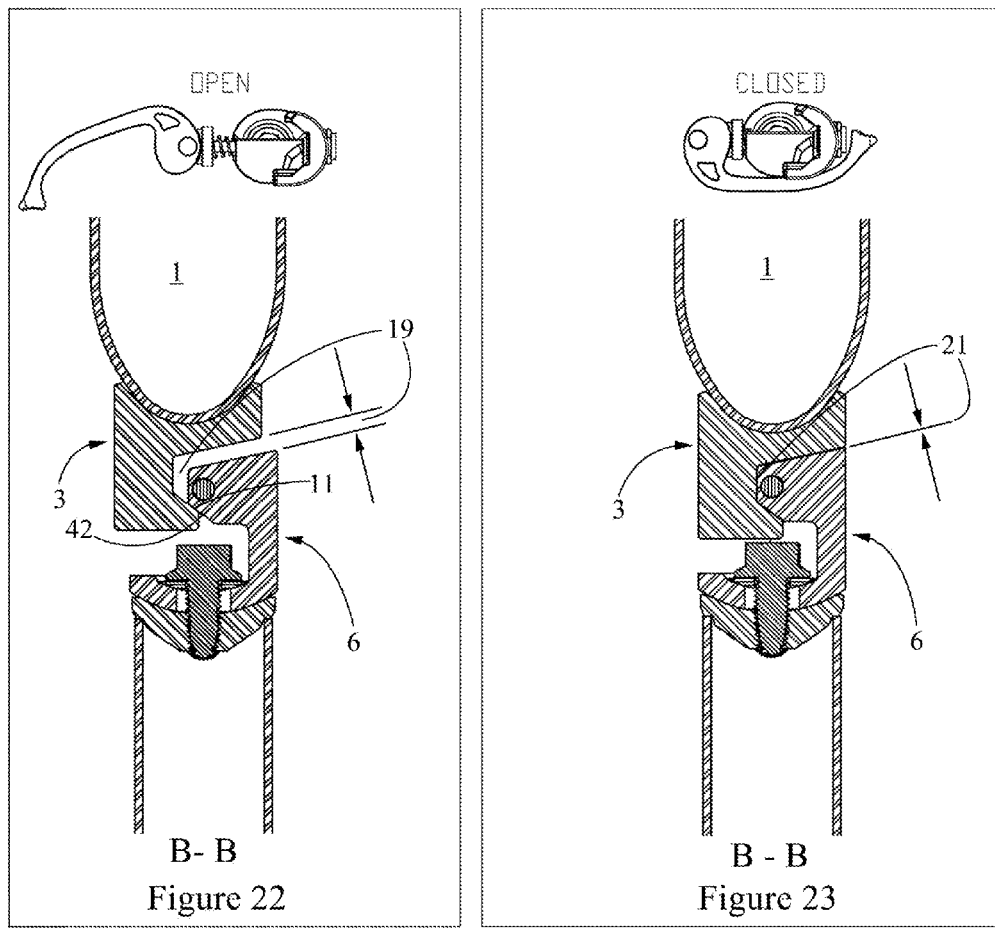
B-B
Figure 22
B-B
Figure 23

NON-OVERLAPPING FRAME FOLDING BIKE

BACKGROUND

A. Field of the Invention

This invention relates to a folding bike that folds on or near the seat tube wherein the front and rear structural frame members bypass each other during folding and do not overlap except at folding and fastening positions and which uses an innovative mechanism to lock the front and a rear frames together in the operative riding position.

B. Background Information

Many folding bicycles have been designed to date which insert a hinging member into a cut main tube near the middle of the bicycle which both hinges and locks the bicycle in the riding position. These bicycles are typically weak and require a number of folding steps making for a bicycle that is complicated to fold and structurally weak. To date the strongest folding bicycles have been those that do not break a structural member and instead fold about concentric tubes located at or near the seat tube such as those shown in U.S. Pat. No. 4,448,437, U.S. Pat. No. 4,900,047, and U.S. Pat. No. 5,975,551.

There are however still areas for improvement in order to increase the strength of the frame assembly and to enhance and simplify the folding operation. In this application, a novel fastening assembly and assembly location is introduced.

SUMMARY OF THE INVENTION

It is the objective of this invention to define a folding bicycle designed such that when the bicycle is folded, the front and rear frame structural members bypass each other in a non-overlapping manner except at folding and fastening positions using a folding axis on or near the seat tube, wherein the folding bicycle maintains a rigid riding position using an innovative fastening mechanism positioned to fasten by actuation of a member located not above the uppermost surface of the front frame, and which may be equipped with primary and secondary retention wherein the secondary retention automatically engages during unfolding. Finally, it is an objective of this invention to define a folding and fastening assembly that is easy to use, simple to manufacture, adjustable to allow for manufacturing tolerances, lightweight, inexpensive, and acts to reduce hinge/axis of rotation tolerances when fastened to provide a rigid riding condition.

This objective is achieved by incorporating an innovative fastening system strategically placed where it does not protrude above the upper-most surface of the front frame. The novel fastening system may use an assembly of wedges that are at varying angles relative to one another and working together to allow for a system where the secondary retention may automatically engage, the act of locking the primary retention may also preload the hinging mechanism to remove unwanted manufacturing tolerance and thereby provide a rigid frame, and the forces encountered during riding may be handled primarily by fixed meeting surfaces and not by the actuating mechanism.

Alternate derivative embodiments that will be apparent to those skilled in the trade that are not shown but which should be considered as embodiments of this invention including but are not limited to: the front or rear frame being made of two or more sub-frame assemblies which may comprise additional hinging and fastening systems; configuring the rear frame to be located above the front frame; the front and/or rear frame of the bicycle made of a single tube or open shapes formed of multiple tubes, or any combination thereof; the axis of rotation located in front of, or in back of the seat tube, or at the mid-point between the two wheels; the fastening mechanism being located at, or in back of, the seat tube; the hinge positioned such as to allow the folded package to have the front wheel left on; the position of the hinging and the position of the fastening devices interchanged; multiple fastening mechanisms; the bicycle equipped with secondary retention that requires manual engagement in order to unfold the bicycle; the fastening mechanism being actuated by something other than a cam quick release; different bicycle types including smaller wheel folding bikes, mountain bikes, pavement bikes, engine or non-human powered bicycles, traditional "women's" style bicycles with a lower top tube; children's bikes; and different frames sizes and wheel sizes. It is apparent to those skilled in the art that these and other modifications of this invention may be practiced without departing from the scope of this invention.

This invention will be described in greater detail by referring to the attached drawing and the description of the preferred embodiment which follows.

BRIEF DESCRIPTION OF THE DRAWINGS

Referring now to the attached drawings which form a part of this original disclosure:

FIG. 4 is the first of a sequence of four figures showing the method of operation of lock assembly 4 during the folding process.

FIG. 5 is the second of a sequence of four figures showing the method of operation of lock assembly 4 during the folding process.

FIG. 6 is the third of a sequence of four figures showing the method of operation of lock assembly 4 during the folding process.

FIG. 7 is the fourth of a sequence of four figures showing the method of operation of lock assembly 4 during the folding process.

FIG. 8 is a section view (Section A-A as shown in FIG. 21) of the hinging area and fastening area with the bicycle approaching the operative riding position but before front lock member 3 has engaged lock assembly 4. FIG. 8 is the first of a sequence of five figures showing the method of operation of lock assembly 4 during the unfolding process.

FIG. 9 is a section view of the hinging area and fastening area with the bicycle approaching the operative riding position when front lock member 3 has initial contact with lock assembly 4. FIG. 9 is the second of a sequence of five figures showing the method of operation of lock assembly 4 during the unfolding process.

FIG. 10 is a section view of the hinging area and fastening area with the bicycle approaching the operative riding position when front lock member 3 has caused the spring loaded assembly of lock assembly 4 to ride up into a loaded, but not yet engaged, position. FIG. 10 is the third of a sequence of five figures showing the method of operation of lock assembly 4 during the unfolding process.

FIG. 11 is a section view of the hinging area and fastening area with the bicycle approaching the operative riding position when front lock member 3 has caused the spring loaded assembly of lock assembly 4 to move to a position where the secondary retention is engaged. FIG. 11 is the fourth of a sequence of five figures showing the method of operation of lock assembly 4 during the unfolding process.

FIG. 12 is a section view of the hinging area and fastening area with the bicycle in the operative riding position with the primary retention engaged. FIG. 12 is the fifth of a sequence of five figures showing the method of operation of lock assembly 4 during the unfolding process.

FIG. 13 is a perspective view of front lock member 3.
FIG. 14 is a perspective view of front lock member 3.
FIG. 15 is a perspective view of lock body 6.
FIG. 16 is a perspective view of lock body 6.
FIG. 17 is a perspective view of wedge 8.
FIG. 18 is a perspective view of how corresponding surfaces of front lock member 3, lock body 6, and wedge 8 assemble and fit together.

FIG. 19 is the first of a sequence of two figures showing how the operation of fastening the primary retention also preloads the hinging mechanism.

FIG. 20 is the second of a sequence of two figures showing how the operation of fastening the primary retention also preloads the hinging mechanism.

FIG. 21 is a side view of the hinging area and fastening area showing the locations of Sections A-A and B-B.

FIG. 22 is a view of Section B-B (as shown in FIG. 21) with the secondary retention engaged, but the primary retention not yet engaged. FIG. 22 is the first of a sequence of two figures showing how the operation of fastening the primary retention draws the two frames together in multiple directions.

FIG. 23 is a view of Section B-B (as shown in FIG. 21) with the primary retention engaged. FIG. 23 is the second of a sequence of two figures showing how the operation of fastening the primary retention draws the two frames together in multiple directions thus preloading the hinging mechanism.

FIG. 24 shows the adjustability of lock assembly 4 and having been adjusted with the front (left) side down as far as possible. FIG. 24 is the first of a sequence of two figures showing that lock assembly 4 is adjustable to account for tolerances found in the manufacturing process.

FIG. 25 shows the adjustability of lock assembly 4 and having been adjusted with the front (left) side up as far as possible. FIG. 25 is the second of a sequence of two figures showing that lock assembly 4 is adjustable to account for tolerances found in the manufacturing process.

FIG. 27 is the first of a sequence of two figures showing a method of pushing on the end of lever 10 causing wedge 8 to disengage.

FIG. 28 is the second of a sequence of two figures showing a method of pushing on the end of lever 10 causing wedge 8 to disengage.

DETAILED DESCRIPTION OF EMBODIMENTS

Figure 1:
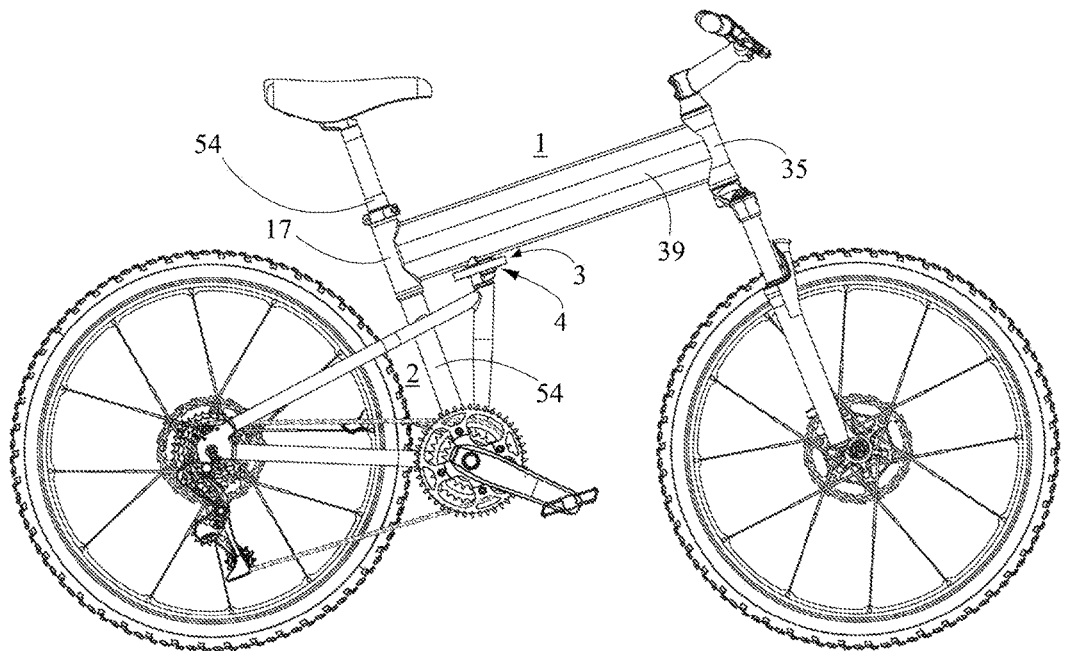
FIG. 1 is a side view of the complete bicycle with front frame 1, rear frame 2 and lock assembly 4 positioned in the operative riding position.

Selected embodiments of the present invention will be described in the following, and shown in the figures. It will be apparent to those skilled in the art that these descriptions and figures are provided for illustration purposes only and not for the purpose of limiting the invention which is as defined by the included claims and their equivalents.

In the embodiments described herein, with reference to the accompanying figures, one numeral designates identical or corresponding elements throughout all figures, where the numbers used to designate the front frame components are generally odd numbers and the numbers used to designate rear frame components are generally even numbers.

A folding bicycle is presented which comprises a seat tube 54, a front frame 1 for mounting a front wheel steering assembly, and a rear frame 2 for mounting a rear wheel. The front frame generally extends from the head tube 35 back to the seat tube area, and the rear frame generally extends from the seat tube area back to the rear wheel center. The front and rear frames are oriented so that when folding each frame can be rotated about a common axis of rotation 15 backward or forward without contacting a structural member of the other frame except at folding and fastening locations, where the axis of rotation is located at or near the seat tube, and the fastening point is located at or near the seat tube. A bicycle fastening mechanism is positioned to fasten the front and rear frames in a locked operative riding position by actuation of a member located not above the uppermost surface of the front frame. One portion of the fastening mechanism may be fastened to a lower surface of the front frame 1 while another portion may be fastened to an upper surface of the rear frame 2. The axis of rotation may consist of a frame member 17 from the front frame and a frame member 54 from the rear frame positioned concentrically and rotatable relative to one another. Positioning of the axis of rotation may be on or near the seat tube including a position proximate to a midpoint between the front and rear wheels.

The folding bicycle contains a hinge mechanism axis of rotation and a fastening system where the fastening system is generally located at a position which is, as measured along the direction of travel of the bicycle, different from the axis of rotation. The fastening system may serve two purposes, the first is to fasten the bicycle together in the operative riding position, and the second is to load the axis of rotation in a manner so as to remove the tolerances in the hinge members such as to reduce movement between the various hinge members during riding.

One example of the folding process will now be described. During folding, the front wheel may or may not be removed depending on design. After consideration of the front wheel, the locking assembly may be operated by first operating lever 10 to unlock primary retention.

Then secondary retention is released and front frame 1 and rear frame 2 are rotated relative to one another to the desired folded position.

Figure 2:
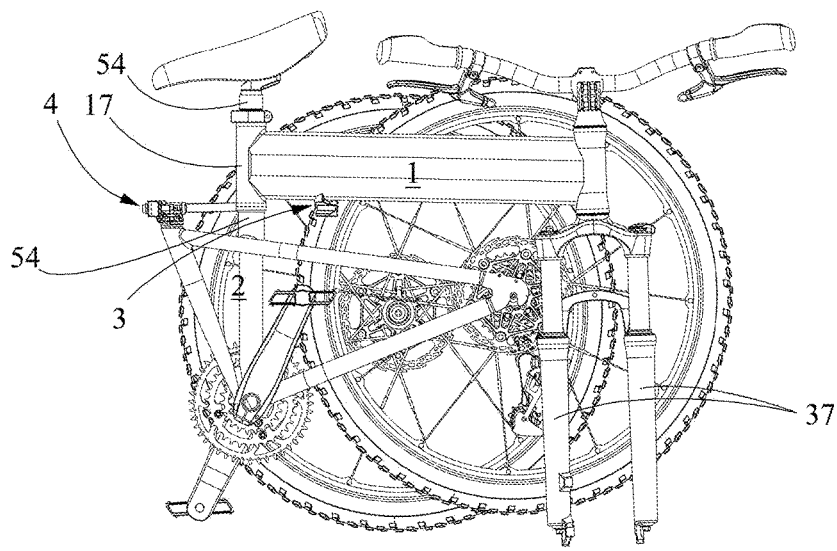
FIG. 2 is a side view of the complete bicycle in the folded position with front frame land rear frame 2 having been pivoted to such a position causing front lock member 3 to separate from lock assembly 4.

Referring now to FIG. 1, many of the elements used on the present invention can be found on a standard conventional bicycle, such as the wheels, drive-train, seat, seat post, handlebar, handle bar stem, brakes, pedals, fork, etc. These elements are not labeled as they are well known. As shown, the steering assembly including handlebar, stem, front fork, front wheel etc. are rotatably mounted to front frame 1 through head tube 35. The drive train, rear wheel, and seat post may be mounted to rear frame 2. Outer seat tube 17 may be a component of front frame 1 and mounted concentrically and rotatably on seat tube 54 which may be a component of rear frame 2. Front main tube 39 is shown with no protrusions such as a locking assembly or locking lever on its upper surface. In the embodiment shown, front lock member 3 and lock assembly 4 are mounted below the front main tube 39 with no components protruding above main tube 39. Front lock member 3 and lock assembly 4 are the two joining components of the locking assembly that hold the bike in the operative riding position. Front lock member 3 may be mounted to front frame 1 and lock assembly 4 may be mounted to rear frame 2. Lock assembly 4 contains the various moving parts required to lock front lock member 3 and lock assembly 4 together however, these parts could also be mounted to front frame 1. Now referring to FIG. 2, the bicycle is shown in the folded position wherein the front wheel has been removed from front fork 37 and lock assembly 4 has separated from front lock member 3 allowing outer seat tube 17 to rotate around seat tube 54 to a folded position. Not shown but apparent to those skilled in the trade are variations on the configurations set forth herein in the figures such as the front and/or rear frames being composed of multiple sub-frame assemblies or different configurations from those shown, variations in the location of the folding axis and fastening points, variations in wheel sizes, embodiments that leave the front wheel fastened to the bicycle during folding, and other variations with non-overlapping frames except at folding and fastening points.

Figure 3:
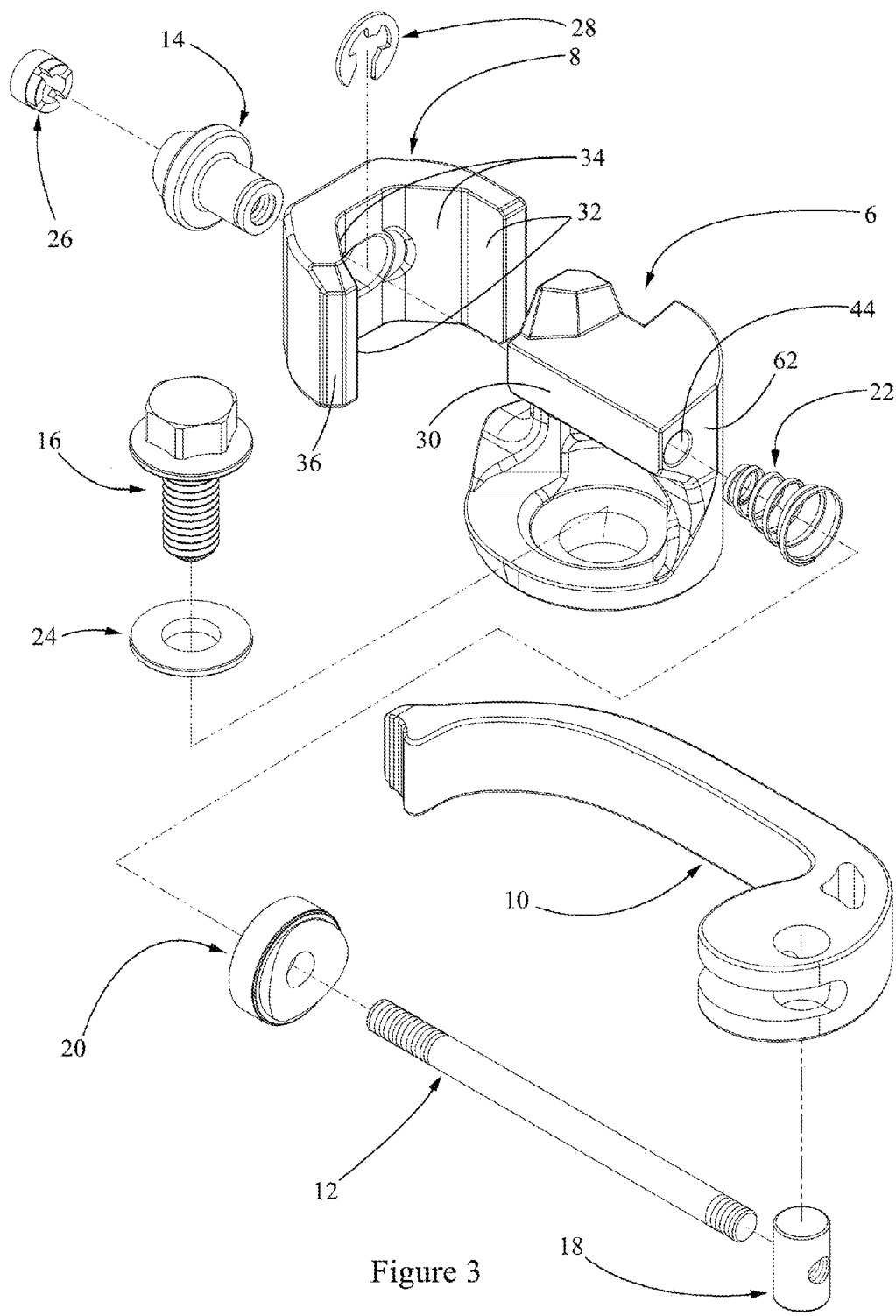
FIG. 3 is an exploded view of the component parts of lock assembly 4.

Now referring to FIG. 3, shown is an exploded view of a lock assembly 4 with lock body 6 being the main member to which most components are mounted. Lock body 6 may be mounted in an adjustable manner using fixing bolt 16 and bowl washer 24 to rear frame 2 (not shown). Mounted through skewer hole 44 in lock body 6 is skewer 12 which holds axle 18 upon which is rotatably mounted lever 10. Lever 10 comprises a cam surface which acts on cam follower 20 which in turn acts on cam acting surface 62 on lock body 6 to create tension in skewer 12 thereby pulling on adjusting nut 14 which is mounted by threading to skewer 12. Wedge 8 is mounted to adjusting nut 14 and held to adjusting nut 14 by c-clip 28 such that wedge 8 moves with skewer 12 as skewer 12 is moved in an axial direction. As lever 10 and skewer 12 are moved axially, spring 22 is compressed and wedge 8 moves relative to lock body 6. Spring 22 also pushes against cam acting surface 62 and biases wedge 8 towards lock body 6. Anti-vibration nylon 26 acts to prevent unwanted rotation of adjusting nut 14 around skewer 12. Wedge 8 is equipped with wedge secondary retention faces 32 and wedge primary retention faces 34 on its inside surface and lock body 6 is equipped with stop face 30. It will be apparent to those skilled in the trade that while a quick release cam is shown, any number of other fastening mechanisms could be used.

Figure 4:
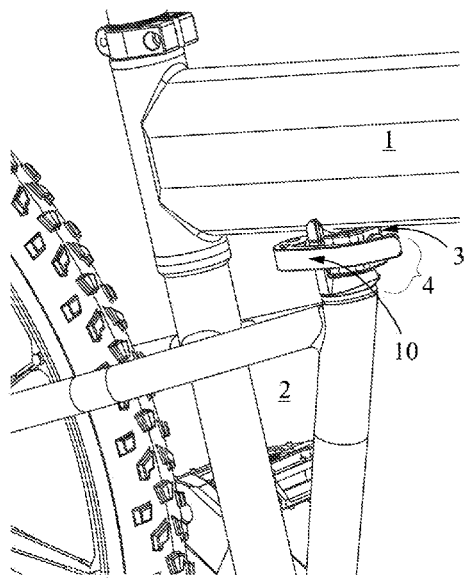
FIG. 4 is a perspective view of the seat tube folding/hinging area and the fastening area with the bicycle in the operative riding position.
Figure 5:
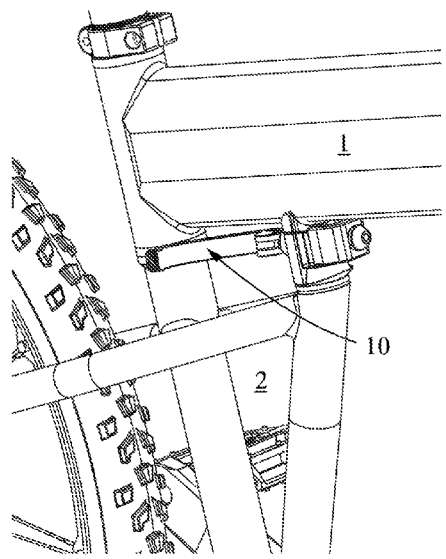
FIG. 5 is a perspective view of the seat tube hinging area and the fastening area with the bicycle approaching the operative riding position but with the first step of folding having been accomplished; lever 10 is opened.
Figure 6:
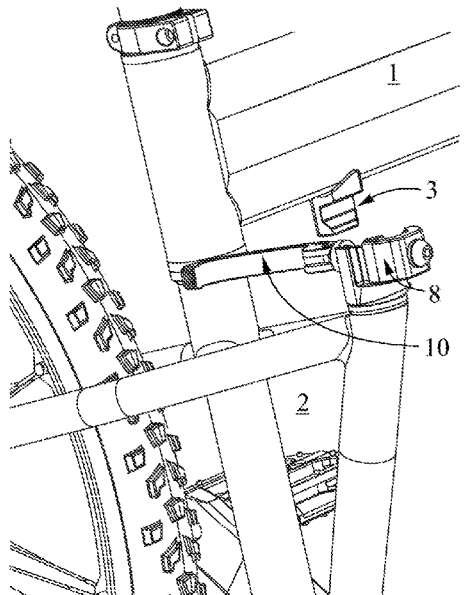
FIG. 6 is a perspective view of the seat tube hinging area and the fastening area with front frame 1 having been partially folded.
Figure 7:
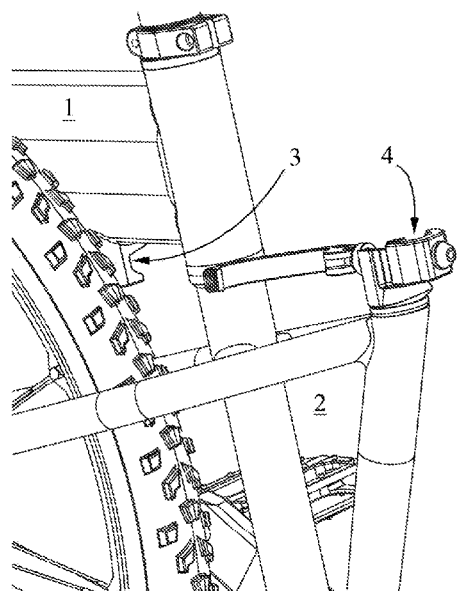
FIG. 7 is a perspective view of the seat tube hinging area and the fastening area with the bicycle in the folded position.

Now referring to FIGS. 4 through 7, shown is the sequence of operations of folding the bicycle. FIG. 4 shows the bicycle in the operative riding position with lever 10 in the fastened state and lock assembly 4 fastened to front lock member 3. Front frame 1 is in line with rear frame 2. FIG. 5 shows lever 10 having been opened and the cam tension having been released. In this state front frame 1 is still generally in line with rear frame 2 and secondary retention is still engaged, but primary retention has been released. FIG. 6 shows lever 10 having been pushed axially against spring 22 (not shown) allowing front lock member 3 to escape from wedge 8 thus releasing secondary retention and allowing front frame 1 to rotate relative to rear frame 2. FIG. 7 shows front frame 1 having rotated to the folded position relative to rear frame 2. FIGS. 4 through 7 demonstrate that in order to release the fastening mechanism and fold the bicycle, the primary retention must be released as in FIG. 5 and the secondary retention must be released as in FIG. 6. The secondary retention system may be biased to remain in the retaining position at all times due to spring 22 causing wedge 8 to capture both lock body 6 and front lock member 3. Thus, if the bicycle is in the operative riding position, the secondary will be in a retaining position for safety. In order to fold the bicycle in the embodiment set forth in the figures, the user must disengage the secondary retention and actively hold it disengaged during the initial act of folding of the bicycle. In this way, the user is not able to leave the bicycle unattended with the secondary retention disengaged which could be dangerous for a would-be rider.

Now referring to FIGS. 8 through 12, one configuration of a folding bicycle locking assembly is shown comprising a secondary retention system wherein the secondary retention system is configured to be biased to an engaged position when the bicycle is in the operative riding position and which automatically engages when the bicycle is unfolded to the operative riding position. Shown is the sequence of operations of the fastening mechanism during the unfolding of the bicycle. For clarity, the view is looking downward, however, front main tube 39 is dotted in to show the location of front frame 1. Rear frame 2 is not shown. Shown is the sequence as the front and rear frames fold about axis of rotation 15 where FIG. 8 shows the bicycle approaching the operative riding position but before front lock member 3 has engaged lock assembly 4. Lever 10 is in the open position and automatic secondary face 5 is about to engage wedge automatic secondary face 36. Secondary retention face 9 and primary retention face 7 have not yet come into contact with their corresponding surfaces on wedge 8. FIG. 9 shows automatic secondary face 5 having just touched wedge automatic secondary face 36 and FIG. 10 shows that automatic secondary face 5 has pushed on wedge automatic secondary face 36 causing wedge 8 to move to the right compressing spring 22. FIG. 11 shows wedge 8 having moved back to the left after the edge has cleared front lock member edge 41 and spring 22 has acted. In this state, the secondary retention is engaged as secondary retention face 9 and rear secondary retention face 40 are now captured by wedge secondary retention faces 32 and due to the angle of secondary retention face 9 and rear secondary retention face 40 being close to perpendicular to the tangent of the path of rotation of front lock member 3, front lock member 3 is no longer able to separate from lock assembly 4 because wedge 8 prevents the separation. Spring 22 acts to keep wedge secondary retention face 32 and wedge 8 retaining front lock member 3, thus engaging secondary retention. Finally, FIG. 12 shows lever 10 having been closed thus engaging the primary retention by causing wedge primary retention faces 34 to push with cam pressure against primary retention face 7 and rear primary retention face 38. In this way, the secondary retention is shown to engage automatically and then the primary retention is manually engaged in order to fasten the bicycle in the operative riding position. It can be seen that Wedge 8 has some ability to move side to side on adjusting nut 14 during this process. As shown wedge 8 fastens front lock member 3 and lock assembly 4 together from moving apart in the hinging direction. However, not shown in this sequence is what prevents front lock member 3 and lock assembly 4 from movement in the vertical plane relative to one another. This will be shown in FIGS. 19 and 20.

Now referring to FIGS. 13 through 18, shown in FIGS. 13 and 14 is front lock member 3 where front lock member 3 may be permanently attached to a lower surface of front main tube 39 at fastening surface 13. The various surfaces that cause the automatic engagement of secondary retention are shown which include automatic secondary face 5 and front lock member edge 41. Secondary retention face 9 is also shown. Primary retention face 7 is also shown. Newly shown here is angled face 11 which can serve two functions. The first function is to extend below a corresponding surface on lock assembly 4 in order to secure front lock member 3 to lock assembly 4 such that front lock member 3 is not able to raise up in a vertical direction relative to lock assembly 4 during the large forces experienced during riding. These forces are transferred from one frame to the other through angled face 11. Therefore, angled face 11 allows for a system which does not cause the forces experienced during riding to be born exclusively by skewer 12. It is novel and important to note that angled face 11 is at approximately a right angle from primary retention face 7. This relative angle causes movement of various components in various directions during locking of lever 10 as will be described subsequently.

FIGS. 15 and 16 show the details of lock body 6 wherein rear secondary retention face 40 and rear primary retention face 38 have been discussed in the sequence of FIGS. 8 through 12. Newly shown here is rear angled face 42 wherein rear angled face 42 acts upon angled face 11 shown in FIGS. 13 and 14 to prevent relative vertical movement of front lock member 3 and lock assembly 4 during the forces experienced during riding. Also newly shown in FIGS. 15 and 16 are convex adjusting surface 46, oversized hole 48, and washer cavity 52 which allow lock body 6 to be adjustably mounted to a bicycle frame such as rear frame 2 so as to account for manufacturing tolerances. In this way lock body 6, a component of lock assembly 4, may be attached to an upper surface of rear frame 2. Anti-rotation tab 50 prevents unwanted rotation of lock body 6 relative to rear frame 2 in an adjustable manner. Like front lock member 3, lock body 6 has two sloping surfaces at approximately a 90 degree angle from one another that cause movement in multiple directions during the fastening of lever 10. FIG. 17 shows wedge 8 with wedge secondary retention faces 32 and wedge primary retention faces 34 and wedge skewer hole 66 which allows for some lateral movement of wedge 8 so as to be able to center for correct alignment during the engaging of the secondary retention surfaces and the primary retention surfaces. Also shown is wedge automatic secondary face 36. FIG. 18 shows how front lock member 3, lock body 6, and wedge 8 fit together with secondary retention surfaces 31 meeting and primary retention surfaces 29 meeting as shown. Also shown is how angled face 11 meets rear angled face 42.

Figure 19:
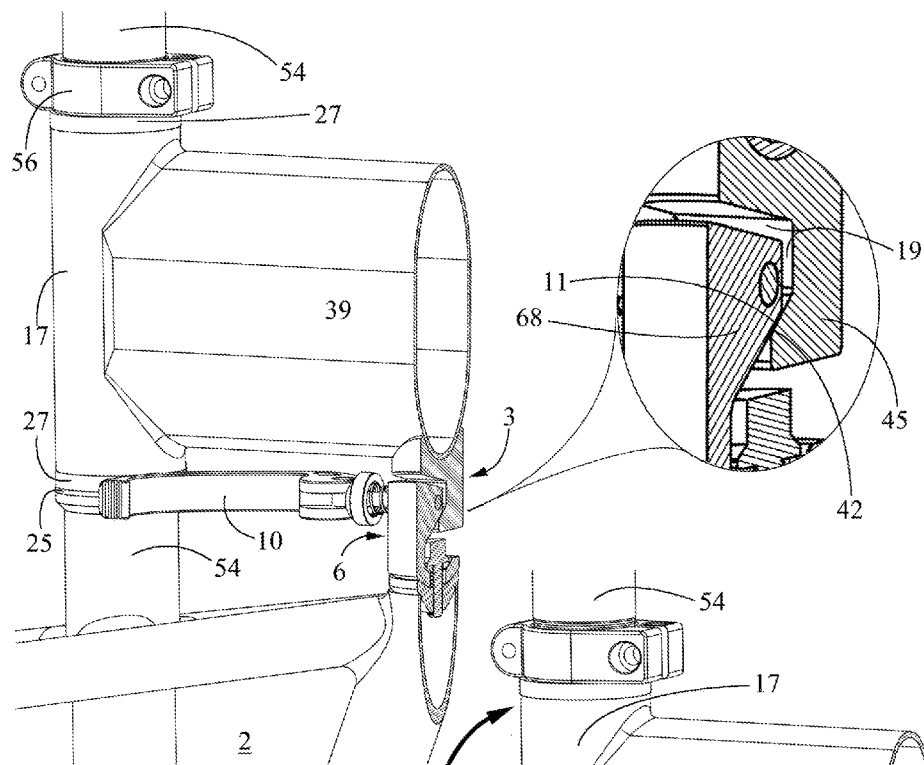
FIG. 19 is a cutaway view of the hinging and fastening area with the secondary retention engaged, but the primary retention not yet engaged.
Figure 20:
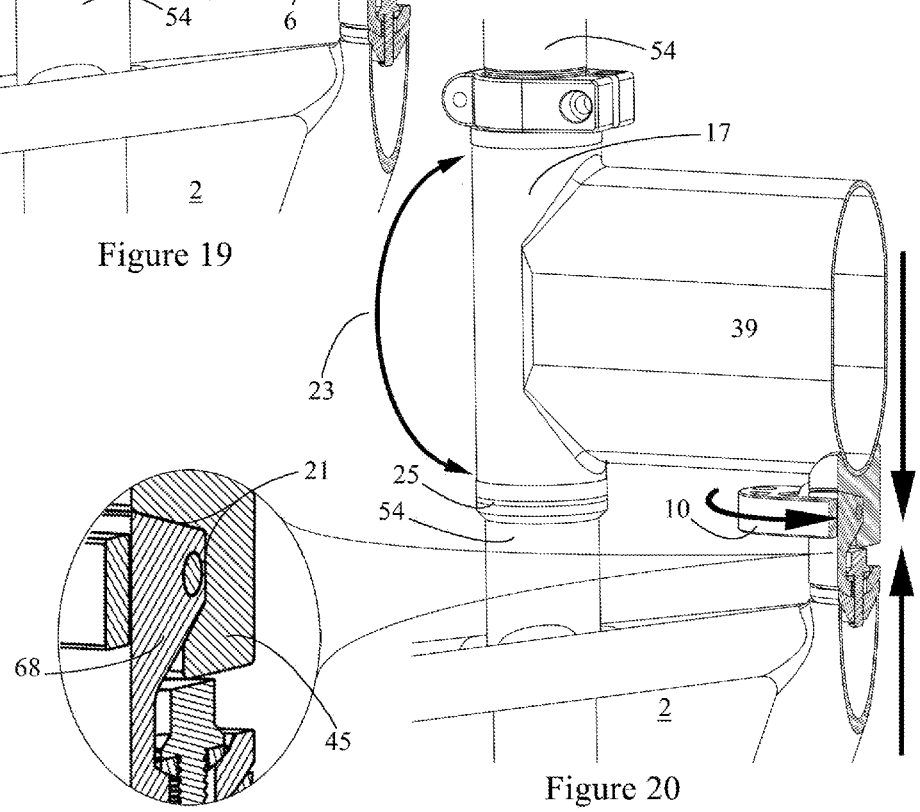
FIG. 20 is a cutaway view of the hinging and fastening area with the primary retention being engaged and the hinge being preloaded.

Now referring to the sequence shown in FIGS. 19 and 20, a folding bicycle is desirable which comprises a folding mechanism, and wherein the fastening mechanism is characterized by an assembly that, when actuated to a locked operative riding position, applies a force 23 on the folding mechanism in a manner so as to reduce any construction tolerance that exists in the folding mechanism. In order to accomplish this the fastening mechanism may comprise an upper element 3 extending downward from the upper frame 1 (which is shown as the front frame but could also be the rear frame), and a lower element 6 extending upward from the lower frame 2 (which is shown as the rear frame but could be the front frame) and wherein, in the act of unfolding the bicycle to the operative riding position, the upper element 3 and lower element 6 meet and are held together by a third retaining element such as wedge 8 (not shown). The upper element 3 contains a catch portion 45 that extends below a portion of the lower element and the lower element contains a catch portion 68 that extends above a portion of the upper element. The upper catch portion 45 and the lower catch portion 68 have corresponding sloping surfaces 11 and 42 that meet when the bicycle is moved to the operative riding position and wherein a third retaining element 8 (not shown) acts to cause the corresponding sloping surfaces to compress causing the upper catch portion and the upper frame 1 to pull up on the lower catch portion and the lower frame 2. Upper element 3 and lower element 6 may contain a plurality of corresponding sloping surfaces with one set 11 and 42 generally parallel to the ground, and one set 38 and 7 (not shown) generally perpendicular to the ground and wherein the third retaining element 8 is actuated by an actuation device 10 and 12 and such actuation causes corresponding sloping surfaces to compress and fasten in both horizontal and vertical directions. This allows for the side to side forces encountered during riding to be generally transferred from front frame 1 to rear frame 2 and from rear frame 1 to front frame 2 through the actuation device 8. Likewise, the vertical forces encountered during riding are generally transferred from front frame 1 to rear frame 2 and rear frame 2 to front frame 1 through the corresponding sloping surfaces 11 and 42 and not through the actuation device 12. This is desirable as the actuation device 12 is often a moving member and not as strong. In summary, when wedge 8 is actuated by lever 10 and skewer 12, wedge primary retention face 34 pushes angled primary retention face 7 and rear primary retention face 38 toward each other thus causing angled face 11 and rear hinge preload face 42 to slide against each other. Angled surface pairs 38, 34 and 7, 34 and 11, 42 are shown at right angles to one another, however, it will apparent to those skilled in the trade that they could be replaced by surfaces at other angles relative to one another or a different shaped surface such as a circular conical shape which would function similarly. More specifically, FIG. 19 shows the bicycle in the unfolded position with the secondary retention engaged, but with lever 10 in the open position such that the primary retention system is not engaged. Moving lever 10 to the closed position shown in FIG. 20 can accomplish two things. First, it serves to fasten the primary retention system as demonstrated in FIGS. 11 and 12. Second, it can cause rear hinge preload face 42 to slide upward along angled face 11 thereby causing hinge preload 23 which removes unwanted tolerance in the hinging mechanism. This transpires because the downward slide by angled face 11 along rear hinge preload face 42 pulls front lock member 3 downward, which in turn pulls front main tube 39 downward thus applying a moment arm force on outer seat tube 17 which in turn removes any manufacturing tolerance found between bushings 27 and outer seat tube 17 and seat tube 54. In this way primary unlocked space 19 is reduced to primary locked space 21 or eliminated. Seat tube clamp 56 is clamped to seat tube 54 which is part of rear frame 2 and holds bushing 27 and outer seat tube 17 in place. Also shown are one or more vertical adjusting spacers 25 which adjust front frame 1 up or down relative to rear frame 2 to account for manufacturing tolerances. This process is further demonstrated in the sections drawn in FIGS. 22 and 23.

Figures 24, 25:
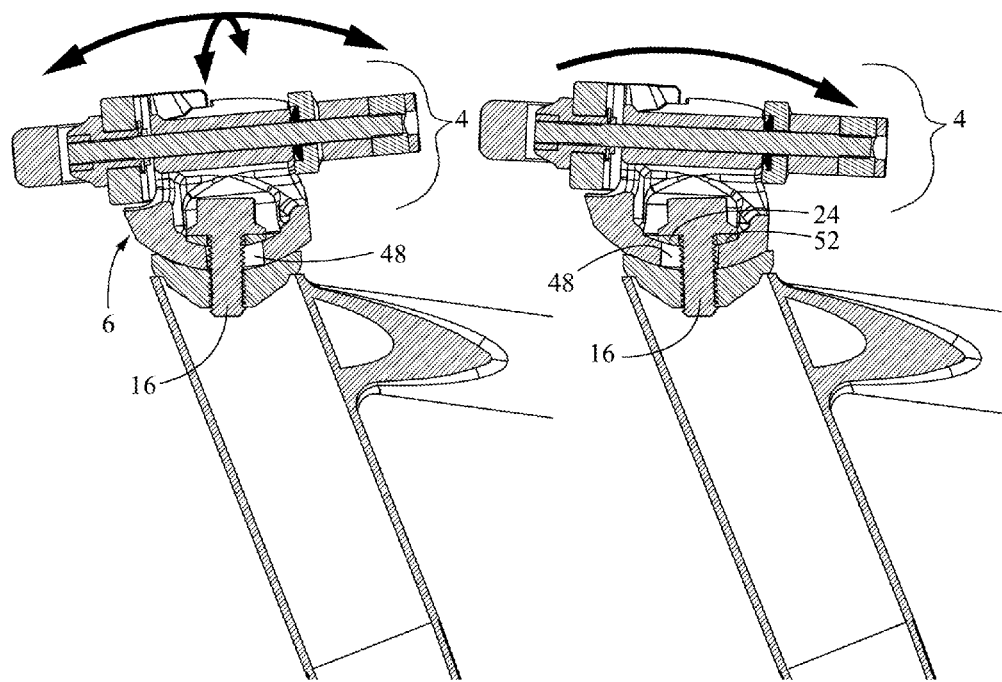
FIG. 24 is a view of a vertical section taken through lock assembly 4 on a plane parallel to the bicycle wheels and 90 degrees (around a vertical axis) from the section shown in FIGS. 19 and 20.
FIG. 25 is a view of a vertical section taken through lock assembly 4 on a plane parallel to the bicycle wheels and 90 degrees (around a vertical axis) from the section shown in FIGS. 19 and 20.
Figure 26:
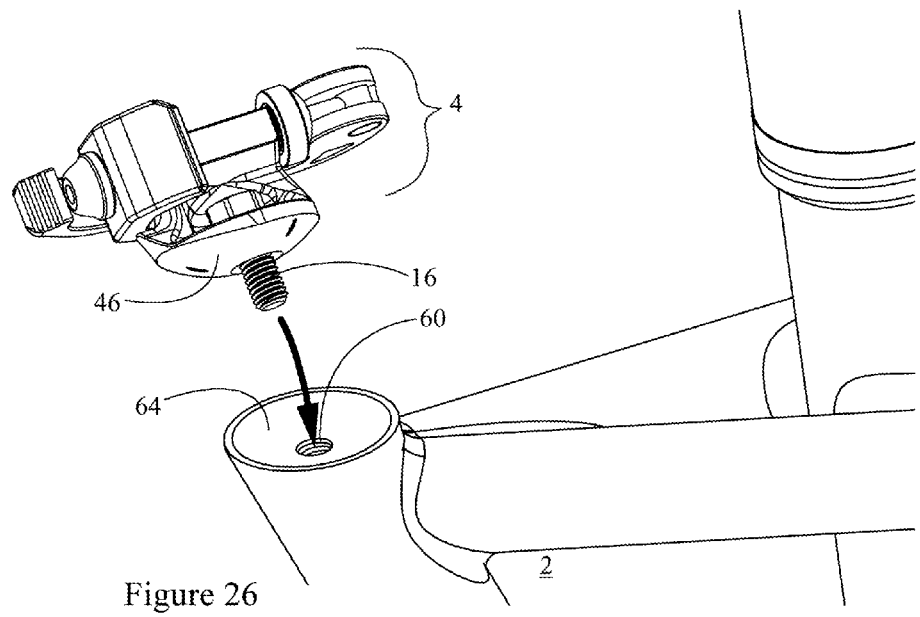
FIG. 26 is a perspective view of one method of mounting lock assembly 4 to rear frame 2.

Manufacturing tolerances are always present and therefore incorporating systems to account for them is important in any assembly. The present invention can require angled surfaces fastened to different frames, and usually offset from the hinging position, to meet at the correct location and angle, and therefore the ability to make angle adjustments post-manufacturing is important. FIGS. 24 through 26 show a folding bicycle wherein the fastening mechanisms 3 and/or 4 are attached to the front frame 1 or the rear frame 2 in a manner allowing them to be adjusted from time to time relative to the front or rear frame to allow for manufacturing tolerances. One method of accomplishing this is as shown, where lock assembly 4 can be adjusted in an angular manner by loosening fixing bolt 16, which is threaded into threaded hole 60, and having convex adjusting surface 46 slide on adjusting bowl 64, and bowl washer 24 slide on washer cavity 52 while fixing bolt 16 moves inside oversized hole 48 to the desired position. As these surfaces are spherical, angle adjustment is possible in any direction but is only shown in FIGS. 24 and 25 in a direction parallel to the wheels of the bicycle. This adjustability combined with vertical adjustment using vertical adjusting spacers 25 allows for a wide range of adjustment. Not shown but apparent to those skilled in the trade is an assembly also adjustable in a direction parallel to the centerline of the bicycle frame.

Figure 27:
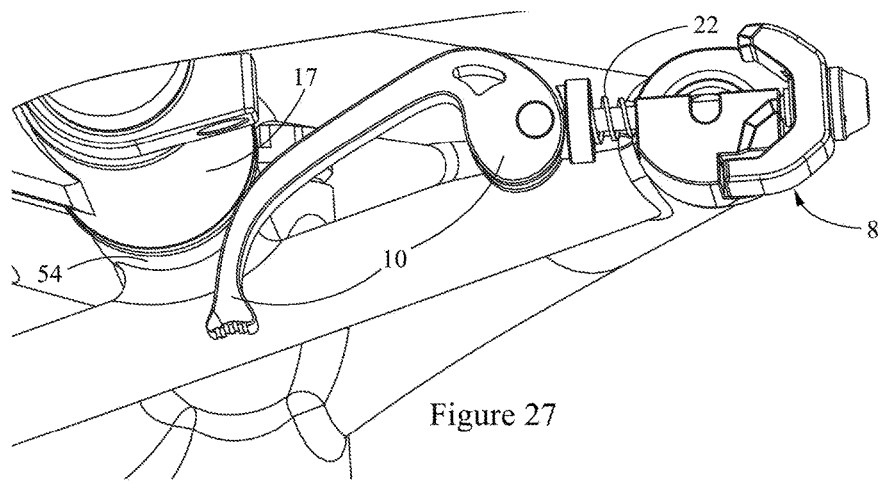
FIG. 27 is a perspective view of lock assembly 4 mounted to rear frame 2.
Figure 28:
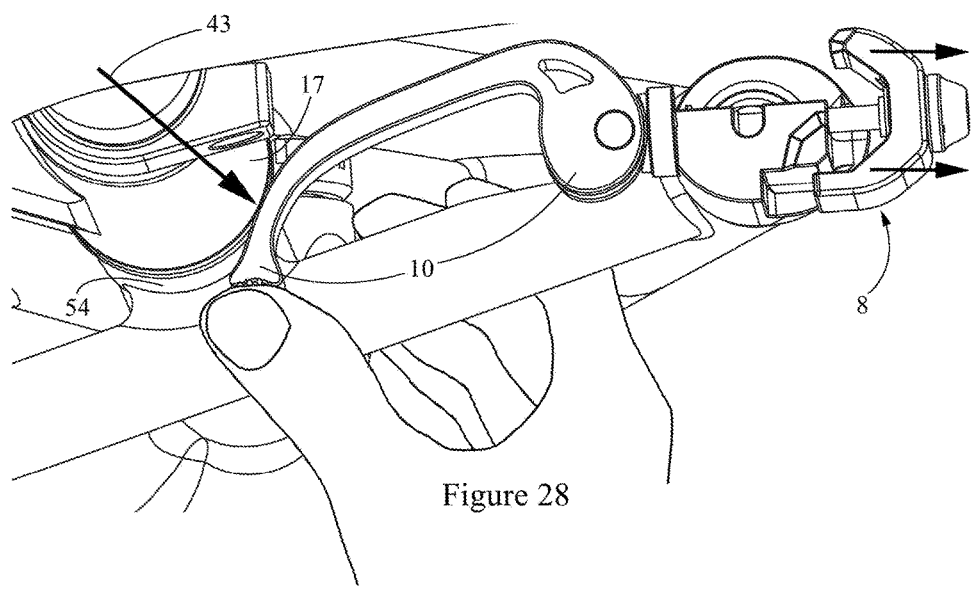
FIG. 28 is a perspective view of lock assembly 4 mounted to rear frame 2.

Ease of use of any locking assembly on a folding bicycle is desired, and FIGS. 27 and 28 show how, after lever 10 is operated to release primary retention, a second operation is required in order to release secondary retention. One method of operation consists of moving wedge 8 forward by pushing on lever 10 which pivots off outer seat tube 17 at axis of rotation point 43.

Throughout these figures, it should be noted that front frame 1 is shown as a single main tube, however, it may be comprised of a plurality of frame members fastened together in a fixed manner or a hinged, or suspension manner, or a removable manner, or a manner where members are moveable relative to one another such as those found on folding bikes. In addition, rear frame 2 may be comprised of a single member, or a plurality of frame members fixed together as shown, or a plurality of frame members fastened together in a hinged, suspension, or removable manner which are moveable relative to one another such as those commonly found in bicycle suspension or folding bikes.

In considering the breadth of the present invention, the terms "member," "portion," "component", "part" or "element" when used in the singular form can also be considered to include the plural form including multiple parts. The term "comprising" when used is intended to specify the inclusion of the described features, components or steps, but does not exclude other features, components or steps not described. The terms "hinging", "pivoting", "rotating", and "folding" and their derivatives are used interchangeably and have the same meaning. The terms "locking", and "fastening" and their derivatives are used interchangeably and have the same meaning. The term "engaged" means to be fastened together. The term "primary retention" refers to the system that is the primary lock. The term "secondary retention" refers to the system that holds or locks the assembly if the primary retention is released or fails.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

The invention claimed is:

1. A folding bicycle comprising
    a seat tube,
    a front frame for mounting a front wheel fork assembly, and
    a rear frame for mounting a rear wheel,
    said front and rear frames oriented so that when folding each frame can be rotated about a common axis of rotation without contacting a structural member of the other frame except at folding and fastening locations, and structural members of said front frame and said rear frame bypass each other and do not overlap except at the folding and fastening locations,
    said axis of rotation located at or near the seat tube, and
    said fastening location positioned in front of and not on the seat tube,
    further comprising a fastening mechanism positioned to fasten said front and rear frames in a locked operative riding position by actuation of a member located not above the uppermost surface of said front frame.

2. The folding bicycle of claim 1 further comprising a folding mechanism located at said axis of rotation, wherein said fastening mechanism, when actuated in the act of unfolding the bicycle to the locked operative riding position, applies a force on said folding mechanism in a manner so as to reduce any construction tolerance in said folding mechanism.

3. The folding bicycle of claim 1 further comprising a secondary retention system wherein said secondary retention system automatically engages when the bicycle is unfolded to the locked operative riding position.

4. The folding bicycle of claim 3 wherein said secondary retention system is configured to be biased to an engaged position when the bicycle is in the locked operative riding position.

5. The folding bicycle of claim 4 wherein said secondary retention system must be manually held disengaged during the initial act of folding said bicycle.

6. The folding bicycle of claim 1 wherein said fastening mechanism is fastened to a lower surface of the front frame and an upper surface of the rear frame.

7. The folding bicycle of claim 1 wherein at least a portion of said fastening mechanism is attached to at least one of said front frame or said rear frame in a manner allowing said at least a portion of said fastening mechanism to be adjustable in position relative to said front or rear frame to allow for manufacturing tolerances.

8. The folding bicycle of claim 1 wherein said front frame is either an upper or lower frame and said rear frame is the corresponding opposite lower or upper frame and wherein said fastening mechanism further comprises an upper element extending downward from the upper frame, and a lower element extending upward from said lower frame and wherein, in the act of unfolding the bicycle to the locked operative riding position, said upper element and said lower element meet and are held together by a third retaining element.

9. The folding bicycle of claim 8 wherein said upper element further contains an upper catch portion that extends below a portion of said lower element and said lower element further contains a lower catch portion that extends above a portion of said upper element.

10. The folding bicycle of claim 9 wherein said upper catch portion and said lower catch portion have corresponding sloping surfaces that meet when the bicycle is moved to the locked operative riding position and wherein said third retaining element acts to cause said corresponding sloping surfaces to compress causing said upper catch portion and said upper frame to pull up on said lower catch portion and said lower frame.

11. The folding bicycle of claim 8 wherein said upper and lower elements each further contain a plurality of corresponding sloping surfaces with one set generally parallel to the ground, and one set generally perpendicular to the ground and wherein said third retaining element is actuated by an actuation device and such actuation causes the corresponding sloping surfaces to meet at a sliding angle to compress and fasten in both horizontal and vertical directions.

12. The folding bicycle of claim 11 wherein at least a portion of the side to side forces encountered during riding are transferred from front frame to rear frame and from rear frame to front frame through said actuation device.

13. The folding bicycle of claim 11 wherein at least a portion of the vertical forces encountered during riding are transferred from front frame to rear frame and rear frame to front frame through said corresponding sloping surfaces and not through said actuation device.

14. The folding bicycle of claim 1 wherein the front frame is comprised of a plurality of frame members.

15. The folding bicycle of claim 1 wherein the rear frame is comprised of a plurality of frame members.

16. The folding bicycle of claim 1 wherein said axis of rotation consists of a frame member from said front frame and a frame member from said rear frame configured in a concentric manner.

17. The folding bicycle of claim 1 wherein said axis of rotation is a substantially vertical axis located at a position proximate to a midpoint between the front and rear wheels.

18. A folding bicycle, comprising:
front and rear frames,
an axis of rotation; and
a fastening system, said fastening system positioned to fasten said front and rear frames in a locked operative riding position by actuation of a member, wherein said axis of rotation comprises hinge members and wherein said fastening system is located at a position which is, as measured along the direction of travel of the bicycle, different from said axis of rotation, and wherein, in the act of unfolding the bicycle to the locked operative riding position, actuation of said fastening system functions to both fasten the bicycle together in the locked operative riding position and to load the axis of rotation by applying a moment arm force in a manner so as to reduce the manufacturing tolerances in said hinge members so as to reduce relative movement between the hinge members during riding.

* * * * *